(12) United States Patent
Montgomery et al.

(10) Patent No.: US 9,151,237 B2
(45) Date of Patent: Oct. 6, 2015

(54) ENGINE CONTROL SYSTEM FOR MOBILE MACHINE

(71) Applicant: Electro-Motive Diesel, Inc., Lagrange, IL (US)

(72) Inventors: Curtis W. Montgomery, Calumet City, IL (US); Dennis J. Melas, Chicago, IL (US); Brad S. Silvers, Plainfield, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 270 days.

(21) Appl. No.: 13/908,648

(22) Filed: Jun. 3, 2013

(65) Prior Publication Data

US 2014/0358401 A1    Dec. 4, 2014

(51) Int. Cl.
*F02D 41/22*        (2006.01)
*F02D 35/02*        (2006.01)

(52) U.S. Cl.
CPC ............... *F02D 35/02* (2013.01); *F02D 41/22* (2013.01); *F02D 2200/021* (2013.01); *F02D 2200/024* (2013.01)

(58) Field of Classification Search
CPC .......... F02D 35/02; F02D 41/22; F01P 11/18; F01M 1/20; F01M 11/10; F01M 2011/1446
USPC .......... 123/41.01, 41.02, 41.05, 41.15, 196 S, 123/198 D; 701/107
See application file for complete search history.

(56) References Cited

U.S. PATENT DOCUMENTS

| 4,429,670 | A | | 2/1984 | Ulanet |
| 5,070,832 | A | | 12/1991 | Hapka et al. |
| 5,315,972 | A | * | 5/1994 | Judy et al. ................. 123/198 D |
| 6,112,150 | A | * | 8/2000 | Irons et al. ..................... 701/114 |
| 6,131,539 | A | * | 10/2000 | Thomas ..................... 123/41.15 |
| 6,510,397 | B1 | * | 1/2003 | Choe .............................. 702/116 |
| 6,678,607 | B2 | * | 1/2004 | Akins et al. .................... 701/114 |
| 6,712,651 | B2 | * | 3/2004 | Kanno .............................. 440/1 |
| 6,941,245 | B2 | | 9/2005 | Longnecker et al. |
| 6,948,395 | B2 | * | 9/2005 | Gierer et al. ..................... 74/335 |
| 7,072,761 | B2 | * | 7/2006 | Hawkins et al. ............... 701/112 |
| 7,546,184 | B2 | | 6/2009 | Meltser et al. |
| 8,875,561 | B2 | * | 11/2014 | Worden et al. ..................... 73/40 |
| 2013/0067994 | A1 | | 3/2013 | Worden et al. |

* cited by examiner

*Primary Examiner* — Hai Huynh
(74) *Attorney, Agent, or Firm* — Finnegan, Henderson, Farabow, Garrett & Dunner, LLP (57) ABSTRACT

A control system is provided for use with an engine. The control system may have a coolant pressure sensor configured to generate a first signal indicative of a pressure of coolant circulating through the engine, and an oil pressure sensor configured to generate a second signal indicative of a pressure of oil circulating through the engine. The control system may also have a controller in communication with the coolant and oil pressure sensors. The controller may be configured to determine functionality of the coolant and oil pressure sensors during operation of the engine, and to selectively allow operation of the engine in a semi-protected mode when the coolant pressure sensor or the oil pressure sensor is determined to be non-functional.

30 Claims, 5 Drawing Sheets

ENGINE CONTROL SYSTEM FOR MOBILE MACHINE

TECHNICAL FIELD

The present disclosure relates generally to an engine control system and, more particularly, to an engine control system for a mobile machine.

BACKGROUND

A mobile machine, for example a locomotive, is equipped with an internal combustion engine that provides motive power for the machine. When the engine malfunctions, the locomotive is typically shut down to avoid a more expensive catastrophic failure of the engine. Shutting down the engine during completion of a mission, however, could leave the locomotive and associated train stranded at a location where service of the engine is difficult to achieve.

One attempt to address the above-described problem is disclosed in U.S. Patent Publication 2013/0067994 (the '994 publication) of Worden et al. that published on Mar. 21, 2013. In particular, the '994 publication discloses a locomotive system capable of detecting an engine coolant leak. The locomotive system includes an engine speed sensor, a coolant pressure sensor, a coolant level sensor, and a controller in communication with the sensors. The controller is configured to create a pressure profile based on a measured coolant pressure and a measured coolant level at a given engine speed. The controller is then configured to diagnose problems with the engine when the profile deviates from an expected profile. When a problem is diagnosed, the controller is configured to generate different levels of low-pressure warnings notifying an operator of different low-pressure coolant conditions. When a measured coolant pressure falls below a critical level, engine power can be derated or the engine can be shut down to prevent damaging temperatures until maintenance can be performed. The decision to derate, shut down, or continue operating when the coolant pressure is outside of a standard pressure range is made by the operator or the locomotive system based on the measured pressures and temperatures within the engine.

Although the locomotive system of the '994 publication may be able to protect a locomotive engine from high temperatures without always shutting the engine down, it may still be less than optimal. Specifically, the locomotive system does not disclose what should be done during loss of sensor data, or how to affect engine operation during a cooling system malfunction when engine temperatures are still within acceptable limits. In addition, the locomotive system may do little to prevent an engine that is near failure from being used to the point of failure at an inconvenient time and/or location.

The disclosed engine system is directed to overcoming one or more of the problems set forth above.

SUMMARY

In one aspect, the present disclosure is directed to a control system for an engine. The control system may include a coolant pressure sensor configured to generate a first signal indicative of a pressure of coolant circulating through the engine, and an oil pressure sensor configured to generate a second signal indicative of a pressure of oil circulating through the engine. The control system may also include a controller in communication with the coolant and oil pressure sensors. The controller may be configured to determine functionality of the coolant and oil pressure sensors during operation of the engine, and to selectively allow operation of the engine in a semi-protected mode when the coolant pressure sensor or the oil pressure sensor is determined to be non-functional.

In another aspect, the present disclosure is directed to a method of controlling an engine. The method may include sensing a pressure of coolant circulated through the engine during operation with a coolant pressure sensor, and sensing a pressure of oil circulated through the engine during operation with an oil pressure sensor. The method may also include determining functionality of the coolant and oil pressure sensors during operation of the engine, and selectively allowing operation of the engine in a semi-protected mode when the coolant pressure sensor or the oil pressure sensor is determined to be non-functional.

In yet another aspect, the present disclosure is directed to another control system for an engine of a mobile machine. This control system may include an oil pressure sensor configured to generate a first signal indicative of a pressure of oil circulating through the engine during completion of a first mission by the mobile machine, and a controller in communication with the oil pressure sensor. The controller may be configured to compare the pressure of the oil to a maximum normal pressure value and a shutdown oil pressure value. The controller may be further configured to selectively inhibit commencement of a second mission by the mobile machine when the pressure of the oil is greater than the maximum normal pressure value and less than the shutdown oil pressure value during completion of the first mission by the mobile machine

DETAILED DESCRIPTION

Figure 1:
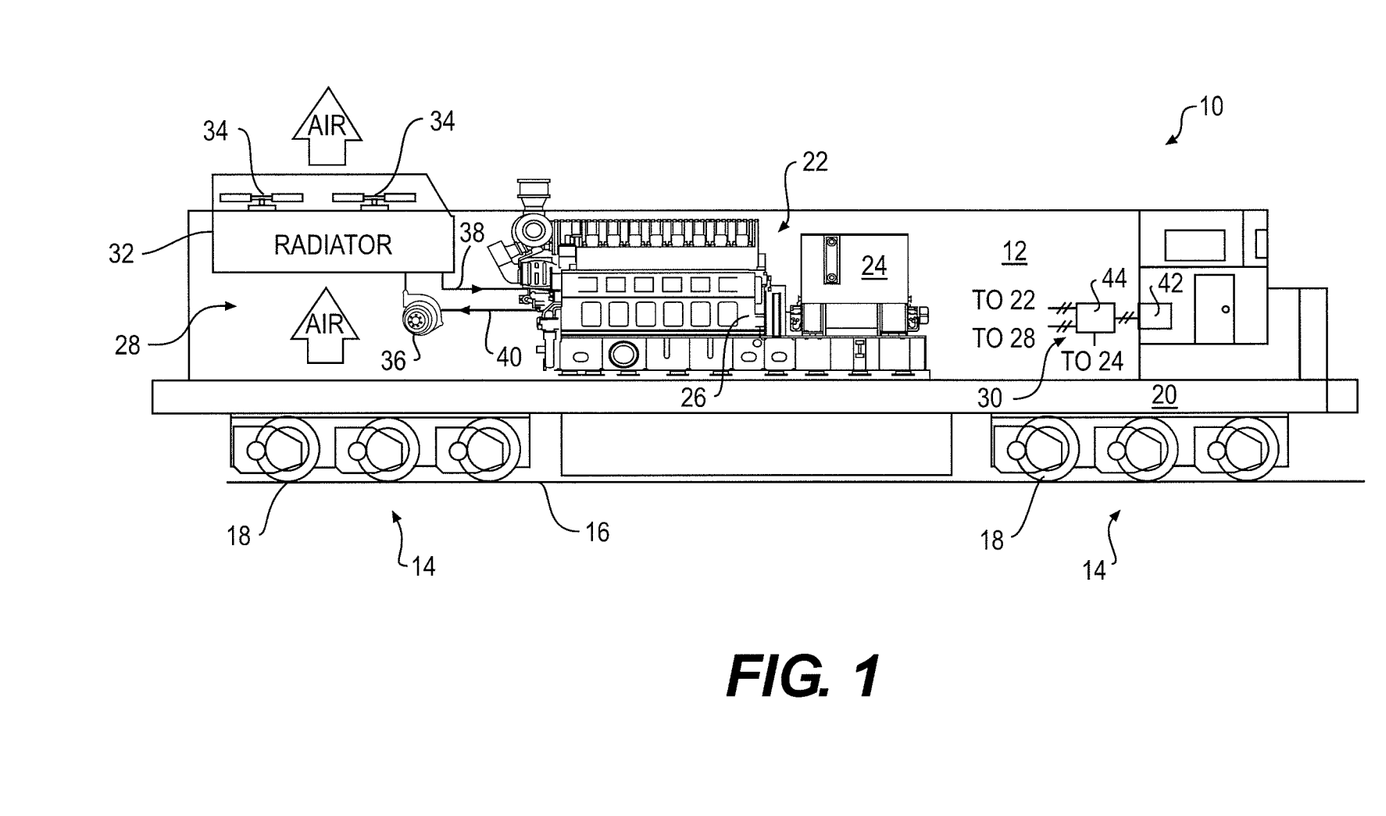
FIG. 1 is an diagrammatic illustration of an exemplary disclosed machine.

FIG. 1 illustrates an exemplary machine 10. Machine 10 may be a mobile machine that performs some type of operation associated with an industry such as transportation, farming, mining, construction, or any other industry known in the art. For example, machine 10 may be a locomotive of a train consist. Machine 10 may include, among other things, a car body 12 that is supported at opposing ends by a plurality of trucks 14. Each truck 14 may be configured to engage a track 16 via a plurality of wheels 18, and to support a frame 20 of car body 12. Any number of engines 22 may be mounted to frame 20, housed within car body 12, and configured to drive a generator 24 that produces electricity to drive wheels 18.

Engine 22 may include an engine block 26 that at least partially defines a plurality of cylinders. For the purposes of this disclosure, engine 22 is depicted and described as a four-stroke diesel engine having twelve cylinders arranged into two banks. One skilled in the art will recognize, however, that engine 22 may be any other type of combustion engine such as, for example, a gasoline or a gaseous fuel-powered engine, and/or that engine 22 may include a greater or lesser number of cylinders, and that the cylinders may be disposed in an "in-line" configuration, a "V" configuration, or any other suitable configuration.

As also shown in FIG. 1, engine 22 may be associated with one or more systems that facilitate the production of power. In particular, engine 22 may be connected to a cooling system 28, and a control system 30 that interfaces with engine 22 and cooling system 28 to regulate cooperation therebetween. In embodiments where more than one engine 22 is included within machine 10, it is contemplated that each engine 22 may be associated with its own dedicated cooling system 28 or with a common cooling system 28, as desired.

Cooling system 28 may include components that function to cool engine 22. Specifically cooling system 28 may include a heat exchanger (e.g., a radiator) 32, one or more fans 34 positioned near heat exchanger 32, and a pump 36. Coolant such as water, glycol, a water/glycol mixture, a blended air mixture, or any other heat transferring fluid may be pressurized by pump 36 and directed through a passage 38 to engine 22 (e.g., to engine oil coolers, to engine cylinder heads, to engine block 26, to engine turbochargers, and/or to other engine components) to absorb heat therefrom. After exiting engine 22, the coolant may be directed through a passage 40 to heat exchanger 32 where the absorbed is released, and then be drawn back through pump 36 to restart the cycle. A bypass circuit (not shown) may be connected between passages 38 and 40, if desired, and used to selectively direct some or all of the coolant from passage 40 around heat exchanger 32 directly to passage 38 in response to one or more input (e.g., based on a temperature of coolant within passages 38, 40). Fan 34 may be used to generate a flow of air through heat exchanger 32 that absorbs heat from the coolant. It is contemplated that cooling system 28 may take another form known in the art, if desired.

Figure 2:
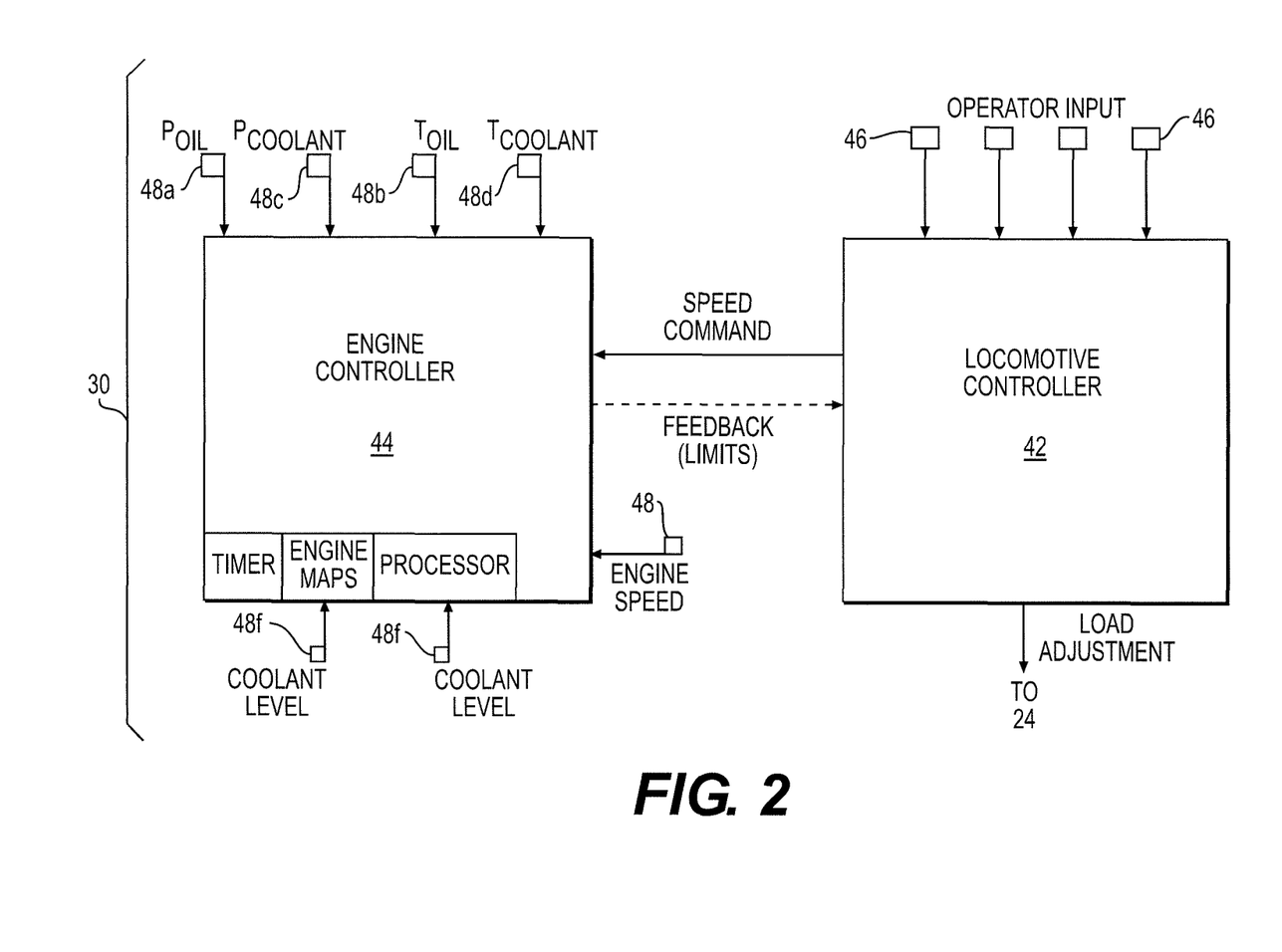
FIG. 2 is a schematic illustration of an exemplary disclosed control system that may be used in conjunction with the machine of FIG. 1.

As shown in FIG. 2, control system 30 may include components that cooperate to regulate operation of engine 22 and/or cooling system 28 in response to a variety of different input. Specifically, control system 30 may include a locomotive controller 42 and a separate engine controller 44. Locomotive controller 42 may be located in or near a cabin of machine 10 and configured to receive input from an operator and responsively regulate machine operations (e.g., command a desired speed of engine 22 and/or adjust a load placed on engine 22 by generator 24). Engine controller 44 may be located near engine 22 (e.g., within car body 12) and configured to regulate engine operations (e.g., impose limits on engine speed and/or load, selectively cause shutdown of engine 22, lockout particular functionality, etc.) in response to instructions from locomotive controller 42 and/or various measured performance parameters of engine 22 and/or cooling system 28. It is contemplated that locomotive and engine controllers 42, 44 could alternatively embody different modules of the same controller, if desired.

Each of locomotive and engine controllers 42, 44 may include a single microprocessor or multiple microprocessors that include a means for controlling an operation of the associated components. Numerous commercially available microprocessors can be configured to perform the functions of controllers 42, 44. Controllers 42, 44 may each include a memory, a secondary storage device, a processor, a timer, and any other components for running an application. Various other circuits may be associated with controllers 42, 44 such as power supply circuitry, signal conditioning circuitry, solenoid driver circuitry, and other types of circuitry.

The different input received by control system 30 may include, among other things, an operator desired travel speed (e.g., a notch setting), a destination location, a mission assignment, an actual coolant pressure, an actual coolant temperature, an actual engine oil pressure, an actual engine oil temperature, an actual coolant level, an actual oil level, an actual engine speed, and other input known in the art. The operator desired travel speed, destination, and mission assignment may be provided to locomotive controller 42 by way of one or more interface devices 46 located within the cabin of machine 10. The actual coolant pressure, coolant temperature, engine oil pressure, engine oil temperature, coolant level, oil level, and engine speed may be provided to engine controller 44 by way of one or more different sensors 48 (e.g., an oil pressure sensor 48a, an oil temperature sensor 48b, a coolant pressure sensor 48c, a coolant temperature sensor 48d, an engine speed sensor 48e, and one or more coolant level sensors 48f). Each of these sensors 48 may be located anywhere near or within the associated components and systems and be configured to generate signals indicative of actual values of the measured parameters. These signals may be directed to engine controller 44 for further processing.

Figure 3:
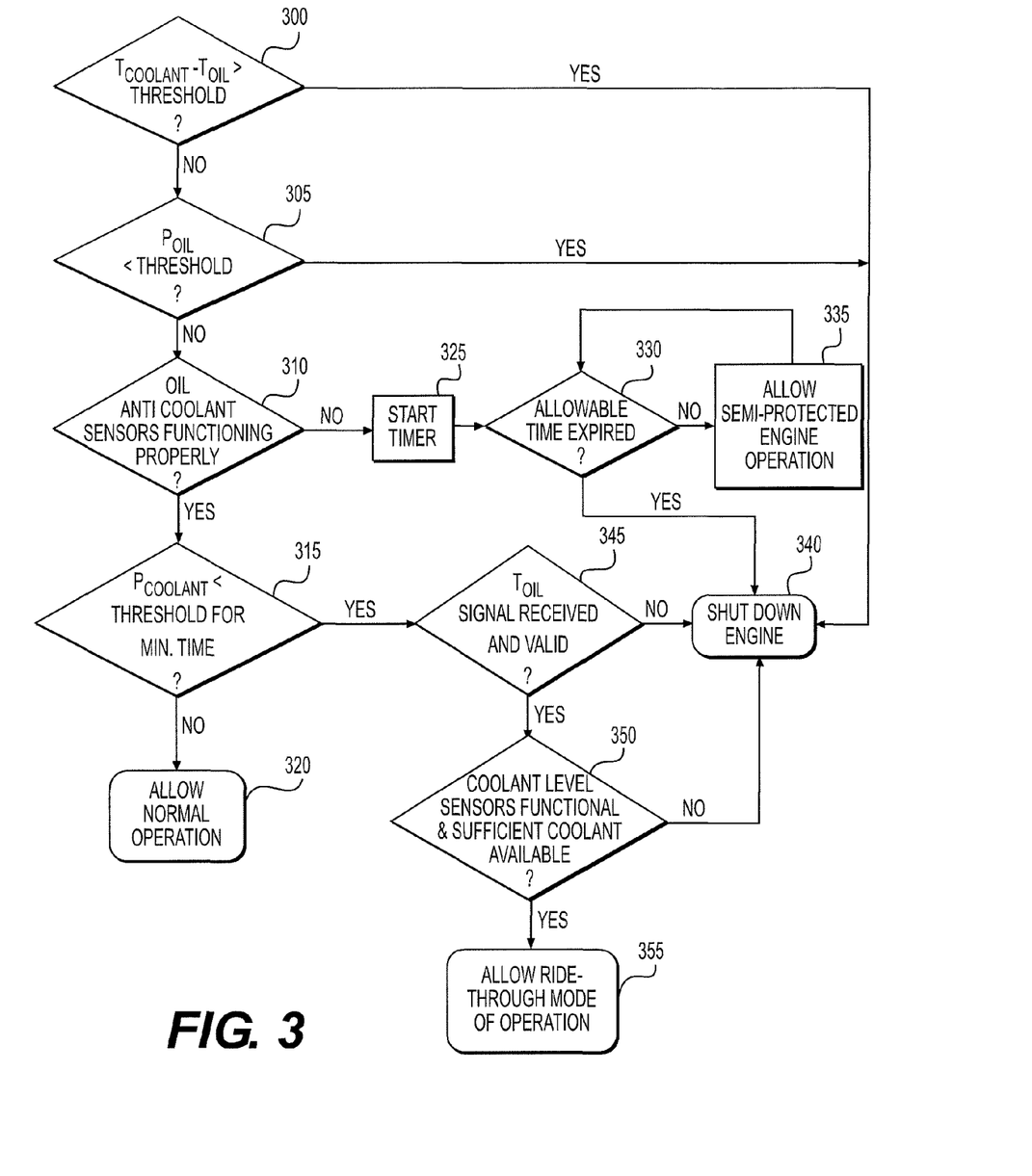
FIGS. 3 and 4 are flowcharts depicting different exemplary disclosed methods of operating the control system of FIG. 2.
Figure 4:
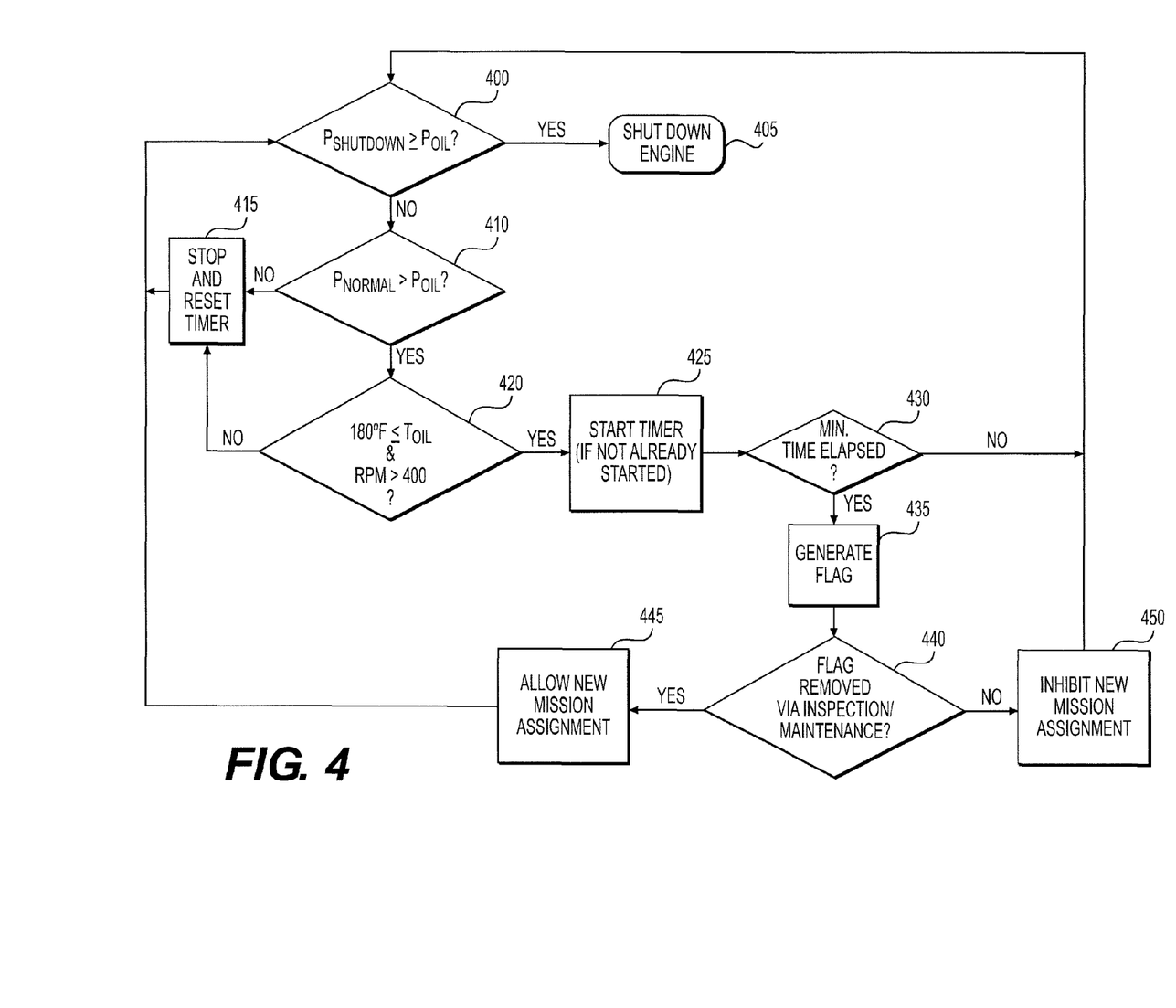
Figure 5:
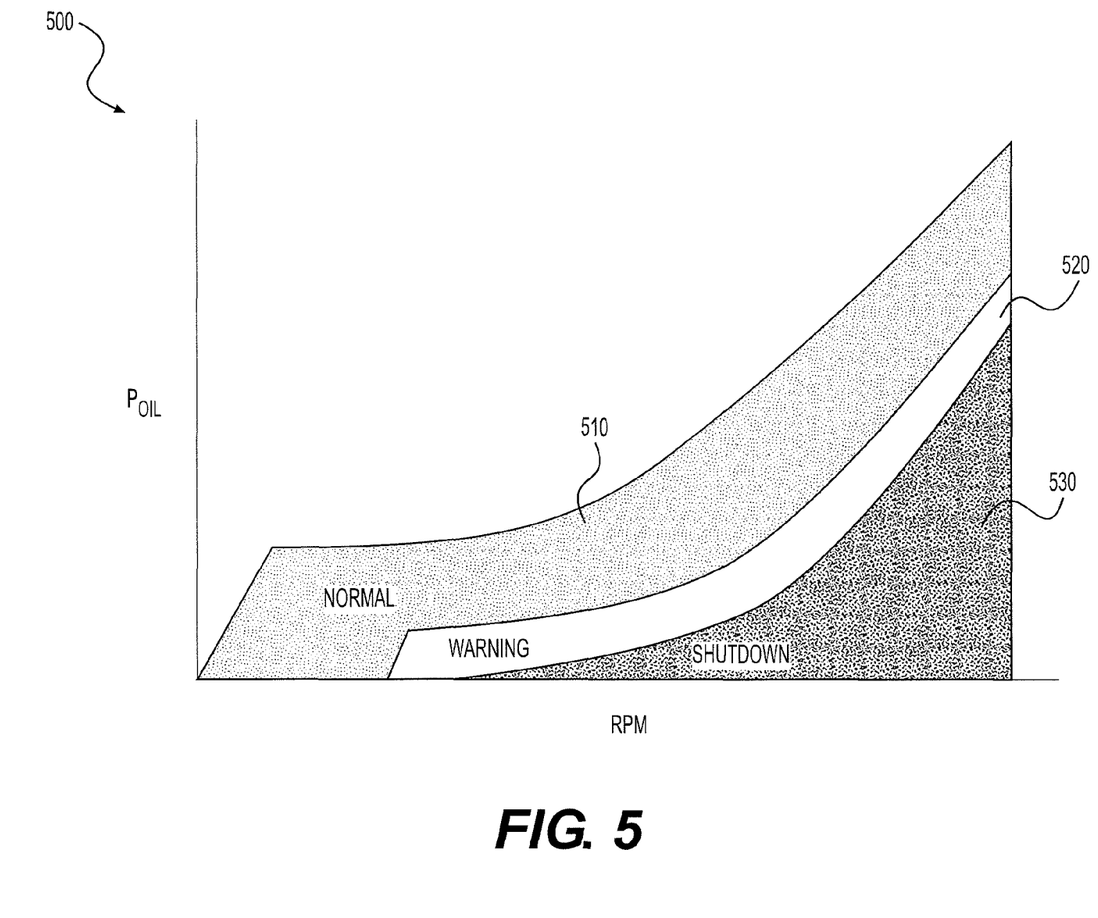
FIG. 5 is an exemplary disclosed control map that may be used during completion of one or both of the methods of FIGS. 3 and 4.

FIGS. 3-5 are illustrations associated with different exemplary disclosed methods of operation. These figures will be discussed in more detail below to further illustrate the disclosed concepts.

INDUSTRIAL APPLICABILITY

The disclosed control system may be applicable to any mobile machine where continued operation of an associated engine during completion of an assigned mission is important. The disclosed control system may provide for continued engine operation in at least two different ways, including managing engine load based on oil temperatures when coolant temperatures are elevated, coolant pressures are low, and/or coolant data is erroneously communicated; and inhibiting mission assignment of a mobile machine when the associated engine is nearing unacceptable operation. These two different control methods will now be explained with reference to FIGS. 3-5.

As seen in FIG. 3, the first control method may begin with engine controller 44 monitoring temperatures associated with cooling system 28 and engine 22 during completion of an already-assigned mission. Specifically, engine controller 44 may compare a difference between an actual coolant temperature (as provided by sensor 48c) and an actual oil temperature (as provided by sensor 48b) to a threshold difference value (Step 300). Normally (i.e., when a significant malfunction has not occurred), the coolant temperature should be about equal to the oil temperature. For example, the coolant temperature should normally be within about +/−8° F. of the oil temperature. When a significant difference between coolant and oil temperatures exists, however, engine controller 44 may conclude that a serious malfunction has occurred and immediately cause engine 22 to shutdown (Step 340). In the disclosed embodiment, a significant difference between coolant and oil temperatures may be considered a difference that is about 50° F. or greater. It is contemplated that engine controller 44 may generate a flag at this point in time (and at all other times when engine 22 is shut down by engine controller 44) indicating the conditions under which engine 22 was shut down, for use in servicing machine 10.

After determining that the difference between the coolant and oil temperatures does not exceed the threshold difference value, engine controller 44 may then compare an actual oil pressure (as provided by sensor 48a) with a threshold pressure value (Step 305). Low oil pressure could result in insufficient lubrication and cooling being provided to components of engine 22. Accordingly, when the actual oil pressure is too low (i.e., below the threshold pressure value), engine controller 44 may conclude that a serious malfunction has occurred and responsively cause immediate shutdown of engine 22 (Step 340).

When, at step 305, however, engine controller 44 determines that the actual oil pressure of engine 22 is above the threshold pressure value, engine controller 44 may then confirm that oil pressure sensor 48a and coolant pressure sensor 48c are both functioning properly (Step 310). Engine controller 44 may confirm this functionality by checking to see if any voltage faults are active and associated with either of sensors 48a, 48c.

If, at step 310, engine controller 44 determines that one or more of pressure sensors 48a or 48c are not functioning properly, engine controller 44 may conclude that the values of the signals generated by these sensors cannot be relied on for control purposes. This does not mean, however, that engine 22 must necessarily be shut down immediately, as there is no evidence that engine 22 is in danger of failure due to lack of cooling or lubrication. Instead, engine controller 44 may start a timer (Step 325) and allow engine 22 to be operated for a discrete period of time regardless of signal values from the failed pressure sensors. In particular, after starting the timer, engine controller 44 may continuously compare an elapsed period of time with an allowable time period (Step 330), and allow which engine 22 to operate in a "Semi-Protected" mode of operation based on the comparison (Step 335). In the Semi-Protected mode of operation, engine controller 44 may ignore signals from pressure sensors 48a, 48c. After the allowable time period has elapsed, control may move to step 340 at which engine 22 is shut down. In one embodiment, the allowable period of time may be about five days. This time period may permit an operator of machine 10 to move to a more convenient shutdown location, to complete the current mission, and/or to try and diagnose and address the cause of the sensor failure prior to engine shutdown. It should be noted that during operation in the Semi-Protected mode, other protection strategies (e.g., a maximum oil temperature strategy) may still be in place.

When engine controller 44 determines at step 310 that a pressure sensor failure has not occurred, engine controller 44 may then determine if the pressure of cooling system 28 is low. That is, engine controller 44 may compare the signal from coolant pressure sensor 48c to a low pressure threshold and see if a low pressure value has been established for at least a minimum amount of time (Step 315). In one example the minimum amount of time may be about two minutes. If the coolant pressure is above the low pressure threshold or is not consistently low, engine controller 44 may allow engine 22 to operate normally (Step 320).

A low coolant pressure signal could be indicative of a coolant leak and an inability to properly cool engine 22. However, even with low coolant pressure, it could still be possible to adequately keep engine 22 below a damaging temperature level. Accordingly, if, at step 315, engine controller 44 determines that the actual coolant pressure is low, engine controller 44 may then check to see if the signal from oil temperature sensor 48b is being received and is valid (e.g., within an expected range) (Step 345). If the signal from oil temperature sensor 48b is not being received and/or is not valid, engine controller 44 may proceed to step 340 and immediately shut engine 22 down.

However, if, at step 345, engine controller 44 determines that the oil temperature sensor 48 is generating and sending valid signals to engine controller 44, engine controller 44 may then check to see if both coolant level sensors 48f are functioning properly and if cooling system 28 has a remaining supply of coolant (Step 350). If either of these conditions is not true, engine controller 44 may proceed to step 340 and immediately shut engine 22 down, as it may not be possible to adequately cool engine 22 without coolant and/or the risk may be too great to attempt to continue engine operation without knowledge of the remaining coolant level. The status of both coolant level sensors 48f may be determined as a redundancy measure, to help ensure proper control of engine temperatures. It is contemplated that control could alternatively be based off of information from a single coolant level sensor 48f, if desired.

When, at step 350, engine controller 44 determines that both coolant level sensors 48f are functioning properly and an adequate supply of coolant remains within cooling system 28 (even though coolant pressure is low), engine controller 44 may allow operation of engine 22 in a "Ride Through" mode (Step 355). The Ride Through mode of operation may include operation wherein a load on engine 22 is tightly regulated based directly on measured oil temperature, regardless of coolant temperature or pressure. For example, as engine oil temperature rises within a desired temperature range, engine load may be decreased so as to lower the engine oil temperature within the range, and vice versa. The load of engine 22 may be selectively adjusted by limiting a travel speed of machine 10 to a particular notch setting corresponding to the temperature. This limit may be imposed regardless of the instructions provided to locomotive controller 42 by the operator. Thus, when locomotive controller 42 commands a speed notch setting higher than the limited setting according to operator request, engine controller 44 may communicate the limit to locomotive controller 42 and deny compliance with the command. At any time throughout operation of machine 10, however, if the actual engine oil temperature rises above the desired range (e.g., rises above about 250° F.), engine controller 44 may immediately shut engine 22 down.

Using this first method of control, it may be possible for machine 10 to continue to operate at select times when otherwise it would normally be shut down. For example, during an oil and/or coolant pressure failure situation, machine 10 may be provided with a window of operational time that allows machine 10 to complete its current mission before being shut down and serviced. In addition, during times of low coolant pressure, as long as engine 22 can be maintained within a desired temperature range and below a maximum temperature level, operation may continue, even if at a reduced level that is based on the actual temperature of engine 22. This may provide a "limp home" functionality that reduces the likelihood of machine 10 from being stranded at an inconvenient location or time.

The second method of control depicted in FIG. 4 may focus on inhibiting a machine 10 from being assigned and embarking on a new mission when the likelihood is high that engine 22 would experience an overheating event during the new mission. This method may be performed continuously throughout operation of machine 10 (e.g., simultaneously with the first method described above), and may not be limited or interconnected at all with the first method. The second method may begin, as illustrated in FIG. 4, with engine controller 44 comparing the actual oil pressure of engine 22 (as measured by oil pressure sensor 48a) with a shutdown oil pressure value (Step 400). When the actual oil pressure of engine 22 is about equal to or less than the shutdown oil pressure level, engine controller 44 may conclude that engine 22 is not receiving adequate cooling or lubrication. In this situation, engine controller 44 may immediately shut engine 22 down (Step 405) to reduce the amount of damage caused to engine 22 by the current conditions.

As long as the actual engine oil pressure is above the shutdown oil pressure level, engine controller 44 may allow completion of the current mission. However, engine controller 44 may still be configured to detect conditions indicative of a future low-pressure condition and respond accordingly. In particular, engine controller 44 may be configured to compare the actual engine oil pressure to a normal pressure threshold value (Step 410). As can be seen in a control map 500 shown in FIG. 5, the range of possible oil pressure values for engine 22 has been divided into multiple regions. These regions include a normal region 510, a warning region 520, and a shutdown region 530. When actual oil pressure values exceed a speed-based shutdown pressure value, the actual oil pressure values fall into the shutdown pressure region 530. As long as actual oil pressure values are below a speed-based normal pressure threshold value, the actual pressure values fall into the normal region 510 and no significant action will be taken by engine controller 44 (i.e., other than to reset a timer—step 415, which will be described in more detail below). However, when actual oil pressure values are greater than the normal pressure threshold value and below the shutdown pressure value, the actual oil pressure values fall in the warning region 520.

When engine oil pressure values fall in the warning region 520, the oil pressure values could be indicative of an impending overheating event of engine 22. Accordingly, engine controller 44 may take additional action to confirm the likelihood of the impending overheating event. Specifically, engine controller 44 may compare the actual oil temperature of engine 22 (as provided by sensor 48b) with a high temperature threshold value and the actual speed of engine 22 (as provided by sensor 48e) with a low speed threshold value (Step 420). In the disclosed embodiment, the high temperature threshold value may be about 180° F., and the low speed threshold value may be about 400 rpm. When the actual oil temperature of engine 22 is less than the high temperature threshold value and the speed of engine 22 is less than the low speed threshold value, the likelihood of engine 22 overheating may be low and engine controller 44 may take no further action. Control may proceed from step 420 through step 415 to step 400.

However, if, at step 420, engine controller 44 determines that the actual oil temperature is greater than about 180° F. and/or the speed of engine 22 is greater than about 400 rpm, engine controller 44 may start a timer (Step 425) and compare an amount of elapsed time with a threshold time value (Step 430). As long as the elapsed time has not exceeded the threshold time value, control may return to step 400 and repeat the above-described cycle. If at any time during repeat of steps 400-430, the actual oil pressure dips below the warning region 520, the actual oil temperature falls below about 180° F., and/or the actual engine speed falls below about 400 rpm, the timer started by engine controller 44 at step 425 may be stopped and reset. This situation may indicate that, although certain parameters may have deviated from normal operation, they did not deviate for long enough to indicate a problem with engine 22.

During the completion of steps 400-430, when the elapsed time exceeds the threshold time value, engine controller 44 may generate a flag (Step 435) indicative of the situation. This flag may contain information regarding the actual oil pressure, the actual temperature, the engine speed, and associated time durations, as well as instructions regarding a service that should be performed before assignment and/or commencement of a new mission. If the service is not completed before commencement of the new mission, the likelihood may be high that engine 22 will experience an overheating event during the new mission.

Engine controller 44 may monitor a status of the flag generated at step 435 to determine if the required service has been performed (Step 440). In one instance, this service may simply include an inspection of engine 22 and/or cooling system 28 and removal of the flag. In another instance, the service may include performance of routine maintenance and/or repair or replacement of a failed component or system. Regardless of the situation, engine controller 44 may only allow assignment and/or commencement of a new mission (Step 445) after the flag generated at step 435 is removed. Otherwise, engine controller 44 may inhibit assignment and/or commencement of the new mission (Step 450). After completion of either of steps 445 or 450, control may return to step 400.

Using this second method of control, it may be possible for machine 10 to avoid engine shutdown partway through a mission. Specifically, a machine 10 that is likely to experience an overheating event may be inhibited from commencing the new mission and instead be serviced before the event can occur. This may help prevent machine 10 from being stranded at an inconvenient time and location.

It will be apparent to those skilled in the art that various modifications and variations can be made to the control system of the present disclosure. Other embodiments of the control system will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A control system for an engine, comprising:
a coolant pressure sensor configured to generate a first signal indicative of a pressure of coolant circulating through the engine;
an oil pressure sensor configured to generate a second signal indicative of a pressure of oil circulating through the engine; and
a controller in communication with the coolant and oil pressure sensors and configured to:
determine functionality of the coolant and oil pressure sensors during operation of the engine; and
selectively allow operation of the engine in a semi-protected mode when the coolant pressure sensor or the oil pressure sensor is determined to be non-functional.

2. The control system of claim 1, wherein:
the controller is further configured to track an amount of time elapsed since determining that the coolant pressure sensor or the oil pressure sensor is non-functional; and
the controller is configured to allow operation of the engine in the semi-protected mode only as long as the amount of elapsed time is less than a threshold time period.

3. The control system of claim 2, wherein the threshold time period is a time period sufficient to allow a mobile machine in which the engine is installed to move to a service location.

4. The control system of claim 2, wherein the controller is further configured to cause the engine to shut down when the amount of elapsed time is about equal to the threshold time period.

5. The control system of claim 2, further including an oil temperature sensor configured to generate a third signal indicative of a temperature of the oil circulating through the engine, wherein the controller is further configured to:
compare the pressure of the coolant to a threshold pressure value;

determine functionality of the oil temperature sensor; and selectively regulate a load on the engine based directly on the third signal when the pressure of the coolant is less than the threshold pressure value.

6. The control system of claim 5, further including a coolant level sensor configured to generate a fourth signal indicative of an amount of coolant available to circulate through the engine, wherein the controller is configured to selectively regulate the load on the engine based directly on the third signal only when the fourth signal indicates the amount of available coolant is greater than a threshold amount.

7. The control system of claim 6, wherein:
the coolant level sensor is first coolant level sensor;
the control system further includes a second coolant level sensor generate a fifth signal indicative of the amount of coolant available to circulate through the engine; and
the controller is configured to selectively regulate the load on the engine based directly on the third signal only when both the fourth and fifth signals indicate the amount of available coolant is greater than a threshold amount.

8. The control system of claim 6, wherein the controller is configured to cause immediate shutdown of the engine when the coolant level sensor is determined to be non-functioning or when the fourth signal indicates an amount of available coolant less than the threshold amount.

9. The control system of claim 5, further including a coolant temperature sensor configured to generate a fourth signal indicative of a temperature of coolant circulating through the engine, wherein the controller is further configured to cause immediate shutdown of the engine when a difference between the temperature of the coolant and the temperature of the oil exceeds a threshold difference value.

10. The control system of claim 5, wherein the controller is configured to selectively regulate a load on the engine based directly on the third signal only when the pressure of the coolant is less than the threshold pressure value for at least a threshold period of time.

11. The control system of claim 10, wherein the controller is configured to selectively regulate a load on the engine based on an operator requested speed when the pressure of the coolant is less than the threshold pressure for a period of time less than the threshold period of time.

12. The control system of claim 1, wherein the controller is further configured to cause immediate shutdown of the engine when the pressure of the oil circulating through the engine is less than a threshold pressure value.

13. The control system of claim 1, further including an oil temperature sensor configured to generate a third signal indicative of a temperature of the oil circulating through the engine, wherein the controller is configured to cause immediate shutdown of the engine when the third signal indicates the temperature of the oil is about equal to or greater than a maximum temperature threshold value.

14. A method of controlling an engine, comprising:
sensing a pressure of coolant circulated through the engine during operation with a coolant pressure sensor;
sensing a pressure of oil circulated through the engine during operation with an oil pressure sensor;
determining functionality of the coolant and oil pressure sensors during operation of the engine; and
selectively allowing operation of the engine in a semi-protected mode when the coolant pressure sensor or the oil pressure sensor is determined to be non-functional.

15. The method of claim 14, wherein:
further including tracking an amount of time elapsed since determining that the coolant pressure sensor or the oil pressure sensor is non-functional; and
selectively allowing operation of the engine in the semi-protected mode includes allowing operation of the engine in the semi-protected mode only as long as the amount of elapsed time is less than a threshold time period.

16. The method of claim 15, further including causing the engine to shut down when the amount of elapsed time is about equal to the threshold time period.

17. The method of claim 15, further including:
sensing a temperature of the oil circulating through the engine during operation with an oil temperature sensor;
comparing the pressure of the coolant to a threshold pressure value;
determining functionality of the oil temperature sensor; and
selectively regulating a load on the engine based directly on the temperature of the oil when the pressure of the coolant is less than the threshold pressure.

18. The method of claim 17, further including sensing an amount of coolant available to circulate through the engine, wherein selectively regulating the load on the engine includes selectively regulating the load on the engine only when the amount of available coolant is greater than a threshold amount.

19. The method of claim 18, further including causing immediate shutdown of the engine when the amount of available coolant is less than the threshold amount.

20. The method of claim 17, further including:
sensing a temperature of the coolant circulating through the engine; and
causing immediate shutdown of the engine when a difference between the temperature of the coolant and the temperature of the oil exceeds a threshold difference value.

21. The method of claim 17, wherein selectively regulating the load on the engine based directly on the temperature of the oil includes selectively regulating the load on the engine only when the pressure of the coolant is less than the threshold pressure for at least a threshold period of time.

22. The method of claim 21, further including selectively regulating the load on the engine based on an operator requested speed when the pressure of the coolant is less than the threshold pressure for a period of time less than the threshold period of time.

23. The method of claim 14, further including causing immediate shutdown of the engine when the pressure of the oil circulating through the engine is less than a threshold pressure value.

24. The method of claim 14, further including:
sensing a temperature of the oil circulating through the engine; and
causing immediate shutdown of the engine when the temperature of the oil is about equal to or greater than a maximum temperature threshold value.

25. A control system for an engine of a mobile machine, comprising:
an oil pressure sensor configured to generate a first signal indicative of a pressure of oil circulating through the engine during completion of a first mission by the mobile machine; and a controller in communication with the oil pressure sensor and configured to:
  compare the pressure of the oil to a maximum normal pressure value and a shutdown oil pressure value; and
  selectively inhibit commencement of a second mission by the mobile machine when the pressure of the oil is greater than the maximum normal pressure value and less than the shutdown oil pressure value during completion of the first mission by the mobile machine.

26. The control system of claim 25, wherein the controller is configured to inhibit commencement of the second mission until service of the engine has been performed after completion of the first mission.

27. The control system of claim 26, wherein:
the controller is further configured to track an amount of time elapsed while the pressure of the oil is greater than the maximum normal pressure value and less than the shutdown oil pressure value during completion of the first mission; and
the controller is configured to selectively inhibit commencement of a second mission by the mobile machine only when the pressure of the oil is greater than the maximum normal pressure value and less than the shutdown oil pressure value during completion of the first mission for at least a threshold period of time.

28. The control system of claim 27, wherein the controller is further configured to cause immediate shutdown of the engine when the pressure of the oil is about equal to or greater than the shutdown oil pressure.

29. The control system of claim 27, wherein the controller is further configured to stop tracking and reset the amount of time elapsed when the pressure of the oil falls below the maximum normal pressure value before the amount of elapsed time exceeds the threshold period of time.

30. The control system of claim 25, further including:
an oil temperature sensor configured to generate a second signal indicative of a temperature of the oil circulating through the engine; and
a speed sensor configured to generate a third signal indicative of a speed of the engine,
wherein the controller is configured to selectively inhibit commencement of the second mission by the mobile machine only as long as the temperature of the oil remains above an oil temperature threshold value and the speed of the engine is maintained higher than a threshold speed.

* * * * *